United States Patent
Kato

(10) Patent No.: US 9,035,488 B2
(45) Date of Patent: May 19, 2015

(54) ELECTRIC STEERING WHEEL LOCK DEVICE

(75) Inventor: Hisashi Kato, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 578 days.

(21) Appl. No.: 13/418,479

(22) Filed: Mar. 13, 2012

(65) Prior Publication Data
US 2012/0234060 A1 Sep. 20, 2012

(30) Foreign Application Priority Data
Mar. 17, 2011 (JP) .................................. 2011-059312

(51) Int. Cl.
*B60R 25/0215* (2013.01)
*B60R 25/24* (2013.01)

(52) U.S. Cl.
CPC ............ *B60R 25/02153* (2013.01); *B60R 25/24* (2013.01)

(58) Field of Classification Search
None
See application file for complete search history.

(56) References Cited

U.S. PATENT DOCUMENTS

| | | | | |
|---|---|---|---|---|
| 4,283,748 A | * | 8/1981 | Gotoh | 361/154 |
| 6,366,041 B1 | * | 4/2002 | Bozio et al. | 318/280 |
| 7,365,450 B2 | * | 4/2008 | Nagae et al. | 307/10.3 |
| 7,714,460 B2 | * | 5/2010 | Yabumoto | 307/10.2 |
| 2009/0084146 A1 | | 4/2009 | Yabumoto | |

FOREIGN PATENT DOCUMENTS

| | | |
|---|---|---|
| JP | 2006-335321 | 12/2006 |
| JP | 2009-083661 | 4/2009 |

* cited by examiner

*Primary Examiner* — Rexford Barnie
*Assistant Examiner* — David Shiao
(74) *Attorney, Agent, or Firm* — Greenblum & Bernstein, P.L.C.

(57) ABSTRACT

An electric steering wheel lock device includes a control circuit that starts and stops supplying power to a motor that actuates a lock mechanism to lock and unlock a movable member of a vehicle steering mechanism. The control circuit changes contact states of first and second relays to switch a supplying direction of the power. A drive restriction unit stops and starts supplying power to a drive circuit for the motor. The control circuit changes contact states of the first and second relays when the drive restriction unit stops supplying power to the drive circuit.

8 Claims, 5 Drawing Sheets

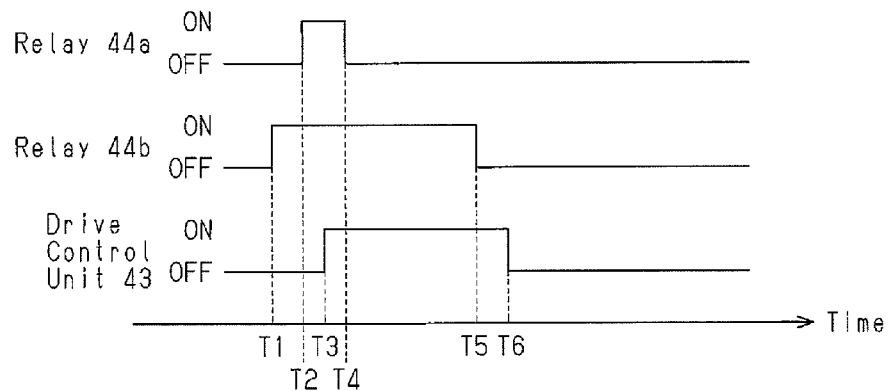
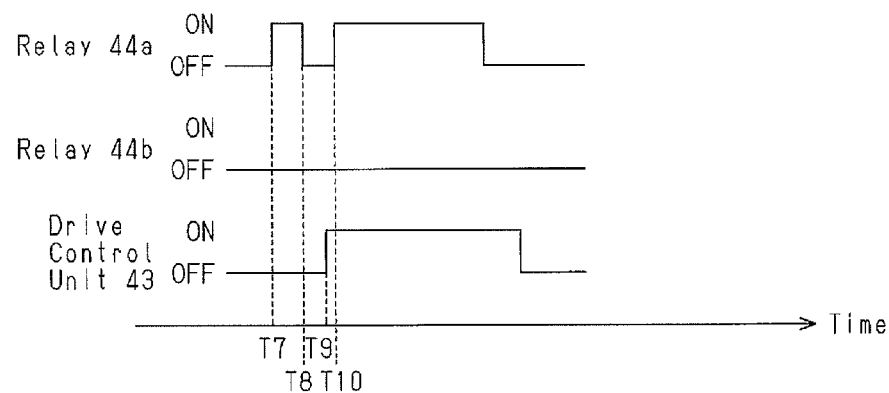
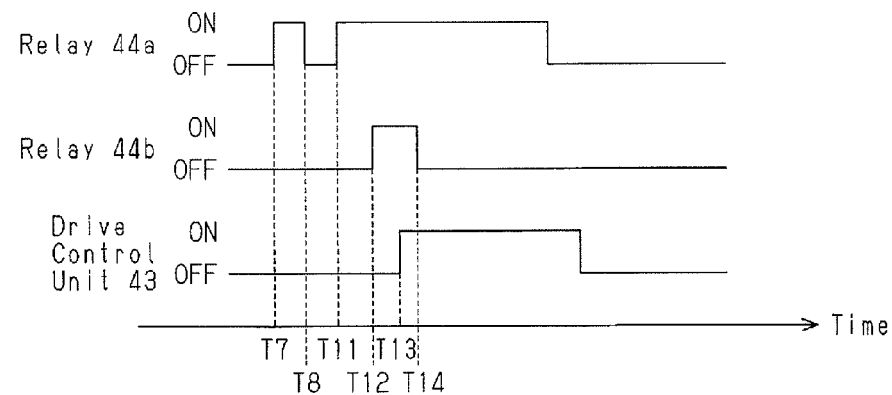

ELECTRIC STEERING WHEEL LOCK DEVICE

CROSS-REFERENCE TO RELATED APPLICATIONS

This application is based upon and claims the benefit of priority from prior Japanese Patent Application No. 2011-059312, filed on Mar. 17, 2011, the entire contents of which are incorporated herein by reference.

BACKGROUND OF THE INVENTION

The present invention relates to an electric steering wheel lock device that is electronically controlled to restrict rotation of a steering wheel.

Vehicles include steering wheel lock devices to restrict rotation of a steering wheel and prevent theft. Japanese Laid-Open Patent Publication No. 2006-335321 (hereafter referred to as the '321 publication) describes an electronically controlled steering wheel lock device. The electronic steering wheel lock device includes a movable lock bar, which is engaged with a steering shaft, a motor, which moves the lock bar, and an electronic control unit, which controls the motor. The electronic control unit switches relays to switch the direction in which current flows through a power supply circuit that supplies current to a motor. The switching of the relays switches the direction in which the motor generates rotation, that is, the movement direction of the lock bar. When the lock bar is in engagement with the steering shaft, rotation of the steering shaft is prohibited. This prohibits rotation of the steering wheel.

In the '321 publication, a field effect transistor (FET) is arranged between the power supply circuit and a power supply (+B). The FET starts and stops the supply of power to the power supply circuit. The FET is controlled by a control unit, which differs from the control unit that switches the power supply circuit. In a state in which the vehicle is being driven (e.g., when a vehicle drive source is actuated), the FET is deactivated and the supply of power to the power supply circuit is stopped. Accordingly, the steering lock of the '321 publication prevents the lock bar from erroneously engaging the steering shaft when the vehicle is being driven.

FIG. 7 illustrates the motor control of the electric steering wheel lock device in the '321 publication. When engaging the lock bar with the steering shaft, a locking relay is activated to close the power supply circuit of the motor. Then, the FET is activated to supply power to the motor.

The relays are mechanical components. Thus, foreign matter, such as dust, may accumulate on a contact of a relay. When the accumulated amount of foreign matter increases, the foreign matter may obstruct conductivity of the relay and stop the supply of current to the motor. For example, as shown in FIG. 7, when deactivating the locking relay to stop supplying power to the motor (time T21), accumulated matter may be entrapped in the relay. In such a case, the accumulated matter obstructs the conductivity of the relay, and the lock bar may remain engaged with the steering shaft.

Normally, to disengage the lock bar from the steering shaft, an unlocking relay is then activated (time T22) and the power supply circuit is closed. Subsequently, the FET is activated to supply power to the motor. However, the conductivity of the locking relay is obstructed by the accumulated matter. Thus, power is not supplied to the motor. As a result, the lock bar may not be disengaged from the steering shaft.

SUMMARY OF THE INVENTION

The present invention provides an electric steering wheel lock device that can by maintained in a satisfactory operational state.

One aspect of the present invention is an electric steering wheel lock device including a control circuit that starts and stops supplying power to a motor that actuates a lock mechanism to lock and unlock a movable member of a vehicle steering mechanism. The control circuit changes contact states of first and second relays to switch a supplying direction of the power. A drive restriction unit stops and starts supplying power to a drive circuit for the motor. The control circuit changes contact states of the first and second relays when the drive restriction unit stops supplying power to the drive circuit.

In this structure, by changing the contact states of the relays, that is, by mechanically activating the relays, the probability of accumulated matter being removed from the relays increases. This lowers the possibility of accumulated matter causing the motor drive circuit to become non-conductive. Accordingly, an operation failure does not occur in the electric steering lock.

Preferably, the drive circuit is connected to a high potential power supply and a low potential power supply. In a state in which the drive restriction unit stops supplying power to the drive circuit, the control circuit first connects the first and second relays to the high potential power supply and then supplies power to the drive circuit before changing a contact state of one of the first and second relays in accordance with a direction in which the motor produces rotation.

In this structure, when the motor drive circuit closes, the activated one of the first and second relays generates an arc due to a sudden change in potential difference. The generation of an arc removes an oxidized film from the contacts of the relay. This suppresses the obstruction of conductivity that would be caused by an oxidized film.

Preferably, the electric steering wheel lock device further includes a conductivity determination circuit arranged between the drive restriction unit, which is arranged at a downstream side of the conductivity determination circuit, and the first and second relays, which are arranged at an upstream side of the conductivity determination circuit. When the control circuit deactivates the drive restriction unit, the control circuit changes the contact state of one of the first and second relays in accordance with the direction in which the motor produces rotation, measures a voltage level with the conductivity determination circuit, detects a conductive state of the drive circuit based on the measured voltage level, determines that a conductivity abnormality is occurring in one of the first and second relays when the conductive state is abnormal, and changes the contact state of one of the first and second relays. The drive restriction unit then supplies power to the drive circuit and opens the drive circuit and subsequently changes the contact state of one of the first and second relays in accordance with the direction in which the motor produces rotation to close the drive circuit. When the conductive state is normal, the drive restriction unit supplies power to the drive circuit.

In this structure, an arc is generated in the relay only when the conductivity is obstructed. When the conductivity is in a satisfactory state, the control circuit starts supplying power to the motor without switching the relays. Since the relays are not switched, the timing at which the motor drive circuit closes, that is, the timing at which the supply of power to the motor starts, is advanced accordingly. This readily switches the electric steering lock between locked and unlocked states.

Preferably, after the control circuit determines the conductive state, the control circuit changes the contact state of the first and second relays to open the drive circuit. Subsequently, when the conductive state is normal, the control circuit activates the drive restriction unit and then changes the contact state of the first or second relay to close the drive circuit. When the conductive state is abnormal, the control circuit changes the contact state of the first or second relay and then activates the drive restriction unit before changing the contact state of the first or second relay to close the drive circuit.

In this structure, an arc is generated in the relays even when the motor drive circuit is normal. This removes an oxidized film from the relays before the oxidized film obstructs conductivity. This suppresses the formation of a large oxidized film from forming on each relay. Further, when the motor drive circuit is abnormal, the contact states of the first and second relays are changed to increase the probability of accumulated matter being removed from the two relays. Then, the drive restriction unit is activated. Afterward, the contact state of one of the relays is changed to generate an arc in the relay and remove the oxidized film.

Another aspect of the present invention is a lock control unit that controls a motor, which actuates a lock mechanism that locks and unlocks a movable member of a vehicle steering mechanism. The lock control unit includes a motor drive circuit connected between a high potential power supply and a low potential power supply. The motor produces rotation in a first direction when a first direction current flows to the motor drive circuit and produces rotation in a second direction when a second direction current flows to the motor drive circuit. Each of the first and second relays is switched between a first contact state, which corresponds to the first direction current, and a second contact state, which corresponds to the second direction current. A switching element opens and closes the motor drive circuit. The switching element is arranged apart from the first and second relays in the motor drive circuit. A control circuit controls the first and second relays and the switching element. The control circuit temporarily switches, before the first direction current is supplied, one of the first and second relays to the second contact state, which corresponds to the second direction current, while keeping the switching element deactivated to open the motor drive circuit. The control circuit activates the switching element to close the motor drive circuit when the one of the first and second relays is temporarily switched to the second contact state. The control circuit switches the one of the first and second relays to the first contact state, which corresponds to the first direction current, when the motor drive circuit is closed.

Accordingly, the present invention provides an electric steering wheel lock device that can be maintained in a satisfactory operational state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a time chart showing the operation of first and second relays and a drive restriction unit in the present embodiment;

FIG. 5 is a time chart showing the operation of the first and second relays and drive restriction unit in a further embodiment;

FIG. 6 is a time chart showing the operation of the first and second relays and drive restriction unit in the present embodiment.

DETAILED DESCRIPTION OF EMBODIMENTS

One embodiment of an electric steering wheel lock device according to the present invention will now be described with reference to FIGS. 1 to 6.

In-Vehicle Device

Figure 1:
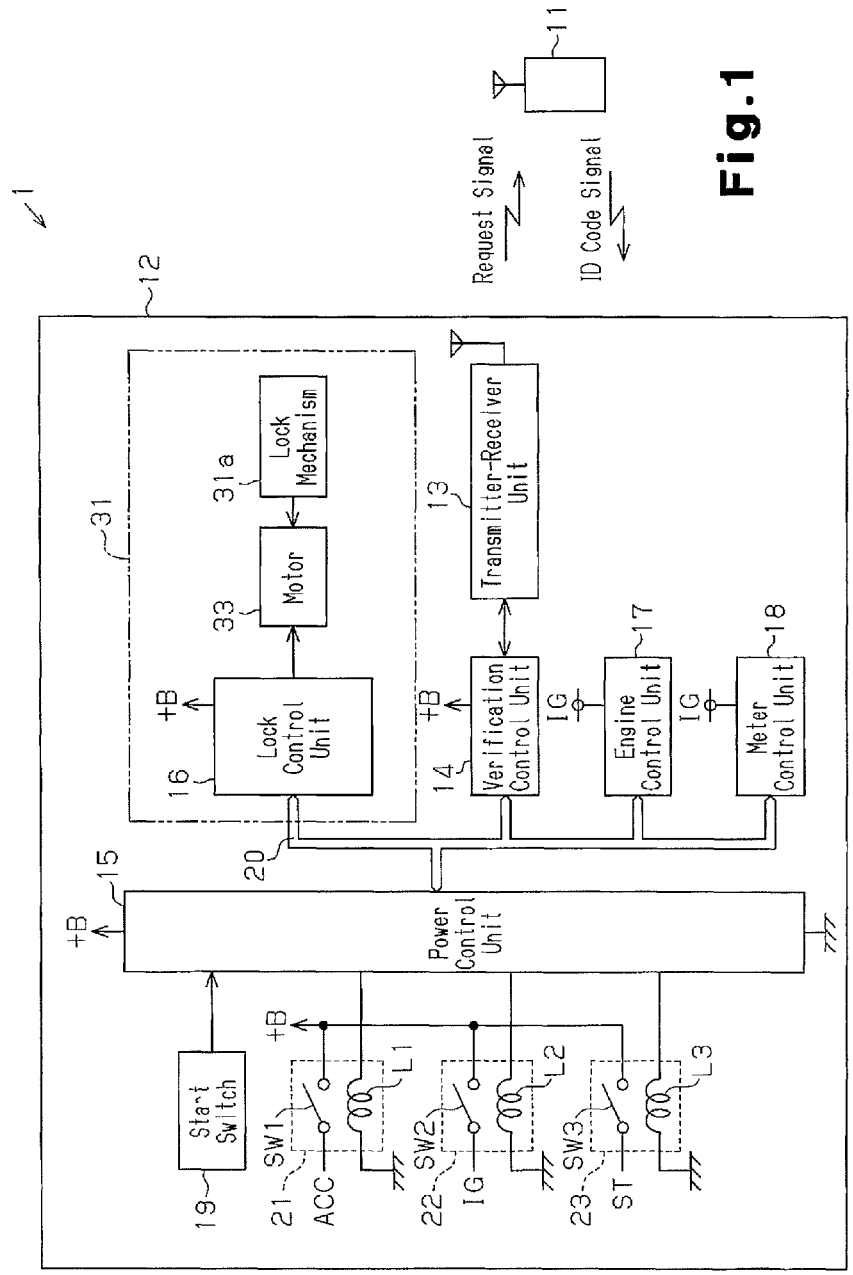
FIG. 1 is a block diagram of a vehicle theft prevention system.

As shown in FIG. 1, an in-vehicle device 12 includes a transmitter-receiver unit 13, a verification control unit 14, a power control unit 15, a lock control unit 16, an engine control unit 17, a meter control unit 18, and a start switch 19. The controls units 14 to 18 may be central processing units (CPUs) including ROMs and RAMs. The control units 14 to 18 are connected to one another by a bus 20 and form a bus-type network. The verification control unit 14, power control unit 15, and lock control unit 16 are connected to a power supply (+B) and normally supplied with power from the power supply. The engine control unit 17, meter control unit 18, and power control unit 15 are connected to an ignition relay 22. The power control unit 15 switches the ignition relay 22 between activated and deactivated states. Further, the power control unit 15 starts and stops the supply of power to the engine control unit 17 and the meter control unit 18.

The verification control unit 14 generates pulsed request signals and verifies various types of information, such as an ID code included in a response signal transmitted from an electronic key 11. The transmitter-receiver unit 13, which is connected to the verification control unit 14, modulates request signals output from the verification control unit 14 into radio waves of a predetermined frequency and transmits the radio waves to a predetermined communication area. The request signal is transmitted to, for example, a vehicle exterior communication area and a vehicle interior communication area. The transmitter-receiver unit 13 receives a response signal, which is transmitted from the electronic key, demodulates the response signal, and provides the demodulated response signal to the verification control unit 14. When provided with the response signal from the transmitter-receiver unit 13, the verification control unit verifies the ID code in the response signal with its preset ID code. When verification is accomplished, the verification control unit 14 outputs a verification accomplishment signal to the bus 20.

An accessory relay (ACC relay) 21, ignition relay (IG relay) 22, and a starter relay (ST relay) 23 are connected to the power control unit 15. The relays 21 to 23 respectively include switches SW1 to SW3 and coils L1 to L3, which activate and deactivate the switches SW1 to SW3. the switches SW1 to SW3 each have one end connected to the power supply and another end connected to an associated in-vehicle device (power supply destination). The coils L1 to L3 each have one end connected to the power control unit 15 by an FET or switching element (not shown) and another end connected to ground. Further, the coils L1 to L3 are each supplied with power. The start switch 19, which is operated by a user, is connected to the power control unit 15. The start switch 19 is arranged in the vehicle near the driver seat.

The power control unit 15 sends an activation signal to the coils L1 to L3 in accordance with the operation of the start switch 19. The coils L1 to L3 activate the corresponding switches SW1 to SW3 in accordance with the activation signal. When the switches SW1 to SW3 are activated, the associated in-vehicle devices are supplied with power. For example, when the switch SW2 is activated, the engine control unit 17 and the meter control unit 18 are supplied with power. The power control unit 15 provides the bus 20 with an information signal indicating the states (activated or deactivated) of the relays 21 to 23.

The engine control unit 17 controls an internal combustion engine (not shown), which serves as a drive source of the vehicle. For example, the engine control unit 17 controls the starting of the engine and the rotation speed of the engine in accordance with the amount by which an acceleration pedal is depressed by a user. When the engine is started, the engine control unit 17 provides the bus 20 with an engine starting completion signal.

The meter control unit 18 controls various instruments that indicate vehicle information, such as the vehicle speed, the engine speed, and the remaining amount of gasoline supplied to the engine. The instruments are arranged on an instrument panel in the vehicle. When the meter control unit 18 is supplied with power and actuated, the meter control unit 18 provides the bus 20 with a vehicle information signal indicating vehicle information.

The lock control unit 16 is included in a steering wheel lock device 31, which permits and prohibits operation of a steering wheel. The steering wheel lock device 31 also includes a motor 33, which is controlled by a lock control unit 16, and a lock mechanism 31a, which permits and prohibits rotation of the steering wheel.

When a signal from the verification control unit 14 indicating that verification has been accomplished in the vehicle and a signal from the lock control unit 16 indicating completion of locking are both received, the power control unit 15 permits starting of the engine. In such an engine starting permitted state, when the start switch 19 is operated, the power control unit 15 sends activation signals to the IG relay 22 and the ST relay 23. The activation signals activate the IG relay 22 and ST relay 23, and the switches SW2 and SW3 of the relays 22 and 23 are activated. This supplies power to the engine control unit 17 and the meter control unit 18. Activation of the ST relay 23 actuates an engine starter. When the start switch 19 is pushed, the power control unit 15 provides the bus 20 with a start signal.

When a signal from the verification control unit 14 indicting that verification has been accomplished in the vehicle and a start signal from the power control unit 15 are both received, the engine control unit 17 executes fuel injection control and ignition control. The engine control unit 17 detects the drive state of the engine from ignition pulses and an alternator output. When determining that the engine is being driven, the engine control unit 17 provides the bus 20 with an engine starting completion signal.

When an engine starting completion signal is received from the engine control unit 17, the power control unit 15 stops sending the activation signal to the ST relay 23 and deactivates the ST relay 23. Further, the power control unit 15 sends an activation signal to the ACC relay 21. In this manner, the power control unit 15 controls activation of the relays 21 and 23 in accordance with the engine starting completion signal. Further, when an engine starting completion signal from the engine control unit is received, the power control unit 15 provides the bus 20 with a motor drive prohibition signal that prohibits driving of the motor 33.

In a state in which the engine starting completion signal is received and the vehicle speed is zero (0), the power control unit 15 stops outputting the activation signal to the IG relay 22 and stops the engine. Here, the supply of power to the engine control unit 17 is stopped. This stops the engine and the output of the engine starting completion signal to the bus 20. When the power control unit 15 stops receiving the engine starting completion signal, the power control unit 15 provides the bus 20 with a motor drive permission signal that permits driving of the motor.

Lock Control Unit

Figure 2:
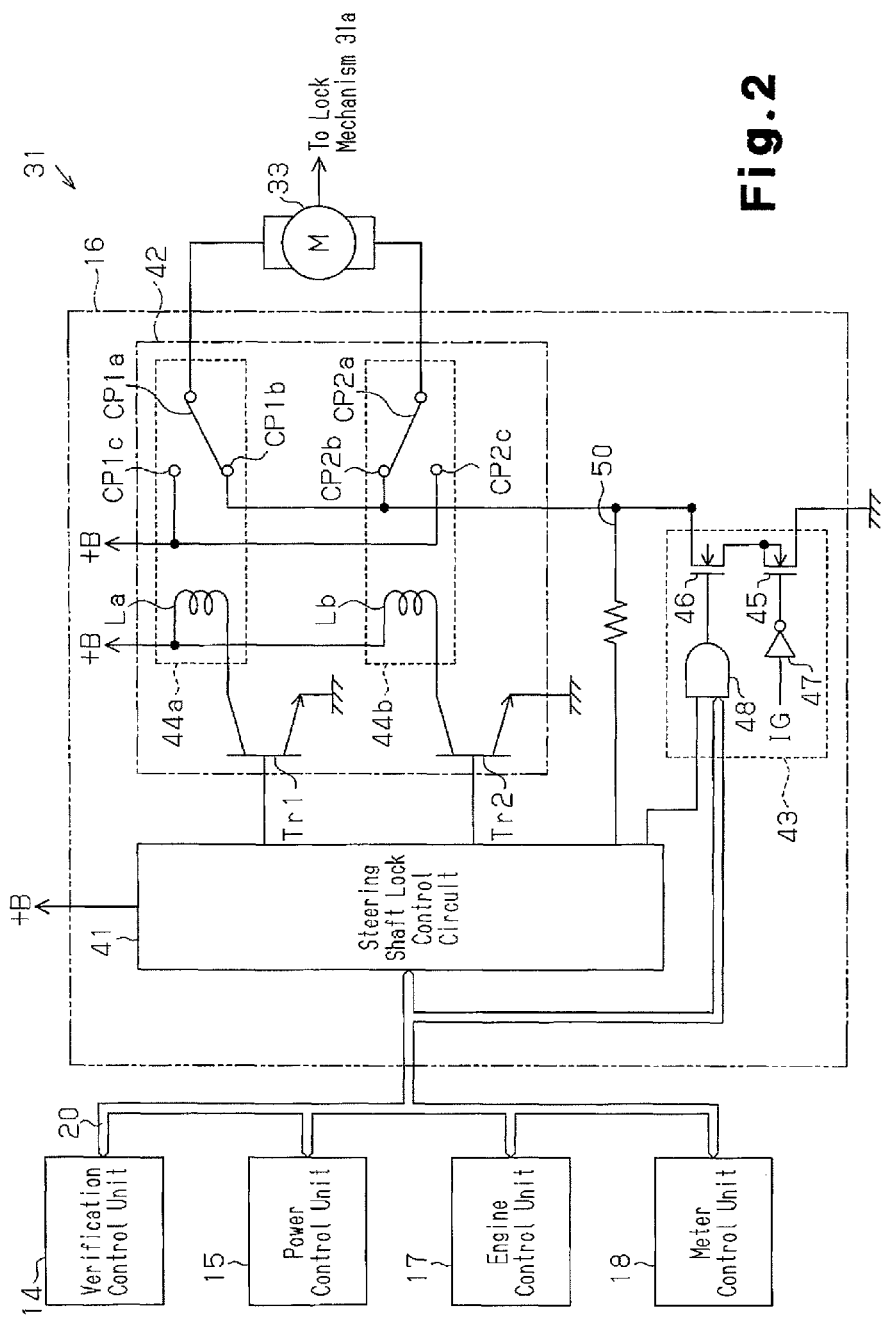
FIG. 2 is a block diagram of an electric steering wheel lock device according to one embodiment of the present invention.

As shown in FIG. 2, the lock control unit 16 includes a steering wheel lock control circuit 41, which is connected to the bus 20. The control circuit 41 is a one-chip microcomputer including a CPU, ROM, and RAM. The control circuit 41 includes a driver unit 42, which starts and stops the supply of power to the motor 33, and a drive restriction unit 43, which starts and stops the supply of power to the driver unit 42.

The driver unit 42 includes a first transistor Tr1, a second transistor Tr2, a first relay 44a, and a second relay 44b. Each of the transistors Tr1 and Tr2 may be formed by an NPN transistor. Further, each of the transistors Tr1 and Tr2 includes a base terminal connected to the control circuit 41. The collector terminal of the first transistor Tr1 is connected to a first end of a coil La in the first relay 44a. The collector terminal of the second transistor Tr2 is connected to a first end of a coil Lb in the second relay 44b. Further, the emitter terminals of the two transistors Tr1 and Tr2 are connected to ground. Second ends of the coils La and Lb are connected to a power supply.

The control circuit 41 controls the transistors Tr1 and Tr2 to control the flow direction of the power supplied to the coils La and Lb. The first relay 44a is activated when the transistor Tr1 goes on, and the second relay 44b is activated when the second transistor Tr2 goes on.

The first relay 44a includes a movable contact CP1a and two fixed contacts CP1b and CP1c. The movable contact CP1a is connected to a first terminal of the motor 33. The fixed contact CP1b is connected to the drive restriction unit 43. The fixed contact CP1c is connected to the power supply. The movable contact CP1a is moved by the power supplied to the coil La to switch the movable contact CP1a between states contacting the fixed contacts CP1b and CP1c.

In the same manner, the second relay 44b includes a movable contact CP2a and two fixed contacts CP2b and CP2c. The movable contact CP2a is connected to a second terminal of the motor 33. The fixed contact CP2b is connected to the drive restriction unit 43. The fixed contact CP2c is connected to the power supply. The movable contact CP2a is moved by the power supplied to the coil Lb to switch the movable contact CP2a between states contacting the fixed contacts CP2b and CP2c.

In the present specification, a circuit, including the relays 44a and 44b, formed from the power supply to ground is referred to as a motor drive circuit. The power supply and ground are examples of a high potential power supply and a low potential power supply, respectively.

The movable contacts CP1a and CP2a are normally in contact with the fixed contacts CP1b and CP2b, respectively. Thus, the motor 33 is normally not supplied with power. When either one of the movable contacts CP1a and CP2a contact the fixed contact CP1c or CP2c, the part of the circuit from the power supply to the drive restriction unit 43 via the motor 33 closes.

The drive restriction unit 43 includes a first switching element 45, a second switching element 46, an inverter 47, and an AND circuit 48. The two switching elements 45 and 46 may be formed by, for example, N-channel power MOSFETs. The drain terminal of the second switching element 46 is connected to the fixed contacts CP1b and CP2b of the first relay 44a and second relay 44b. The source terminal of the second switching element 46 is connected to the drain terminal of the first switching element 45. The source terminal of the first switching element 45 is connected to ground. The two switching elements 46 and 45 are connected in series between the fixed contacts CP1b and CP2b and ground. A conductivity determination circuit 50 is connected between the control circuit 41 and a node between the driver unit 42 and drive restriction unit 43. The control circuit 41 monitors the state of the circuit at the upstream side of the conductivity determination circuit based on the voltage at a resistor in the conductivity determination circuit 50. When the circuit is in a normal state, the control circuit 41 outputs an activation signal to activate the drive restriction unit 43.

The gate terminal of the first switching element 45 is connected via the inverter 47 to the IG relay 22. The inverter 47 includes an input terminal that receives a drive prohibition signal (low level signal) when the IG relay 22 is deactivated and receives a drive permission signal (high level signal) when the IG relay 2 is activated. Accordingly, when the inverter 47 receives a low level signal, the inverter 47 applies high level voltage to the first switching element 45. This activates the first switching element 45. When the inverter 47 receives a high level signal, the inverter 47 applies low level voltage to the first switching element 45. This deactivates the first switching element 45.

The gate terminal of the second switching element 46 is connected to an output terminal of the AND circuit 48. The AND circuit 48 includes two input terminals and one output terminal. A voltage booster circuit is arranged between the output terminal of the AND circuit 48 and the second switching element 46.

A first input terminal of the AND circuit 48 is connected to the bus 20. A second input terminal of the AND circuit 48 is connected to the control circuit 41. The AND circuit 48 selectively receives either one of the drive permission signal (high level signal) and drive prohibition signal (low level signal), which are output from the bus 20 and the control circuit 41. For example, the bus 20 receives a drive permission signal and a drive prohibition signal from the engine control unit 17. The AND circuit 48 outputs a high level signal only when receiving high level signals from both the bus 20 and the control circuit 41. Further, the AND circuit 48 outputs a low level signal when receiving a low level signal from at least one of the bus 20 and the control circuit 41. Accordingly, the second switching element 46 is activated only when receiving high level signals from both the bus 20 and the control circuit 41 and is deactivated under other situations.

When the two switching elements 45 and 46 are activated, the part of the motor drive circuit from the power supply to ground is closed. That is, the supply of power to the motor 33 is started and stopped in accordance with the situation of the drive restriction unit 43.

For example, when the control circuit 41 sends an activation signal to the first transistor Tr1, the first relay 44a is activated thereby connecting the movable contact CP1a and the fixed contact CP1c and closing the motor drive circuit. In this state, in the motor drive circuit, the part from the power supply to the conductivity determination circuit 50 is closed. However, since the drive restriction unit 43 is deactivated, the part of the motor drive circuit from the drive restriction unit 43 to ground is open. In this state, when the control circuit 41 activates the drive restriction unit 43, the motor drive circuit closes from the power supply to ground. In other words, current (first direction current) sequentially flows from the power supply via the first relay 44a, the motor 33, and the second relay 44b to the drive restriction unit 43. As a result, the motor 33 generates rotation in a forward direction. In contrast, when the control circuit 41 sends an activation signal to the second transistor Tr2, the second relay 44b is activated thereby connecting the movable contact CP2a and the fixed contact CP2c and opening the motor drive circuit. In this state, when the control circuit 41 activates the drive restriction unit 43, the motor drive circuit closes from the power supply to ground. In other words, current (second direction current) sequentially flows from the power supply via the second relay 44b, the motor 33, and the first relay 44a to the drive restriction unit 43. As a result, the motor 33 generates rotation in a reverse direction.

Lock Mechanism

Referring to FIG. 3, rotation of the motor 33 is transmitted to the lock mechanism 31a for a steering mechanism. The lock mechanism 31a includes a lock bar 34, a worm 35, and a worm wheel 36. The lock bar 34 engages with a steering shaft 3, which serves as a movable member, and restricts rotation of the steering shaft 3. The worm 35 is fixed to an output shaft of the motor 33 and rotates integrally with the output shaft. The worm wheel 36 converts rotational motion of the worm 35 to linear motion that is transmitted to the lock bar 34. A rack 34a, which includes straight-cut teeth, is formed on the lock bar 34 extending in the axial direction of the lock bar 34. The worm wheel 36 meshes with the rack 34a and transmits rotation to the lock bar 34.

The lock bar 34, which is driven by the motor 33, is movable in directions perpendicular to the axial direction of the steering shaft 3 as indicated by arrows F1 and F2. For example, the lock bar 34 moves in the direction indicated by arrow F1, that is, away from the steering shaft 3, when the motor 33 produces reverse rotation and moves in the direction indicated by arrow F2, that is, toward the steering shaft 3, when the motor 33 produces forward rotation.

Figure 3A:
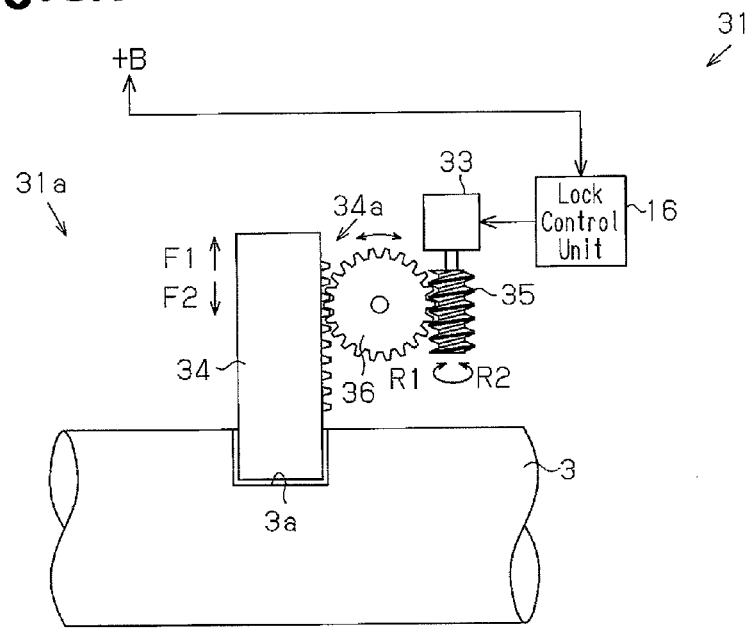
FIG. 3A is a schematic diagram showing a lock mechanism in a state in which rotation of a steering shaft is prohibited.
Figure 3B:
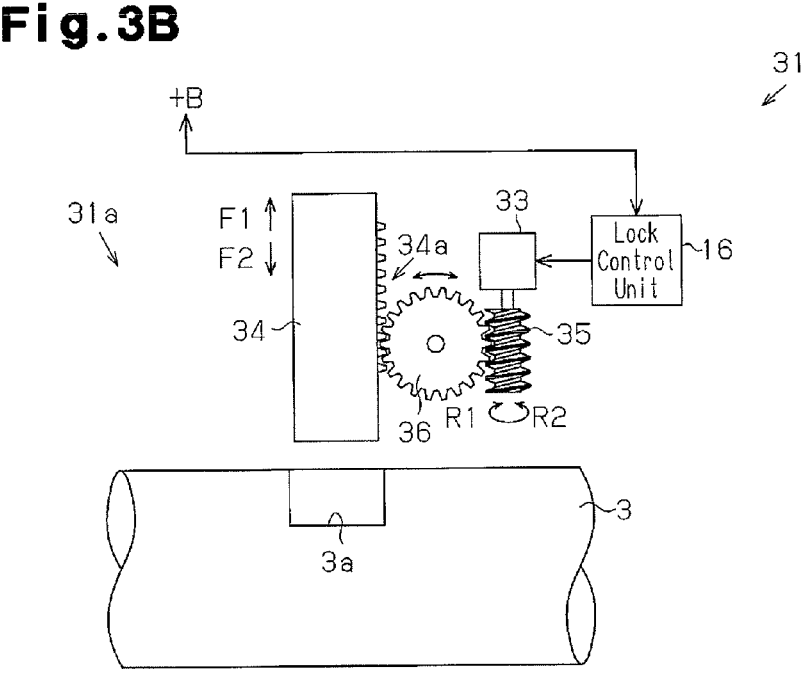
FIG. 3B is a schematic diagram showing the lock mechanism in a state in which rotation of a steering shaft is permitted.
Figure 7:
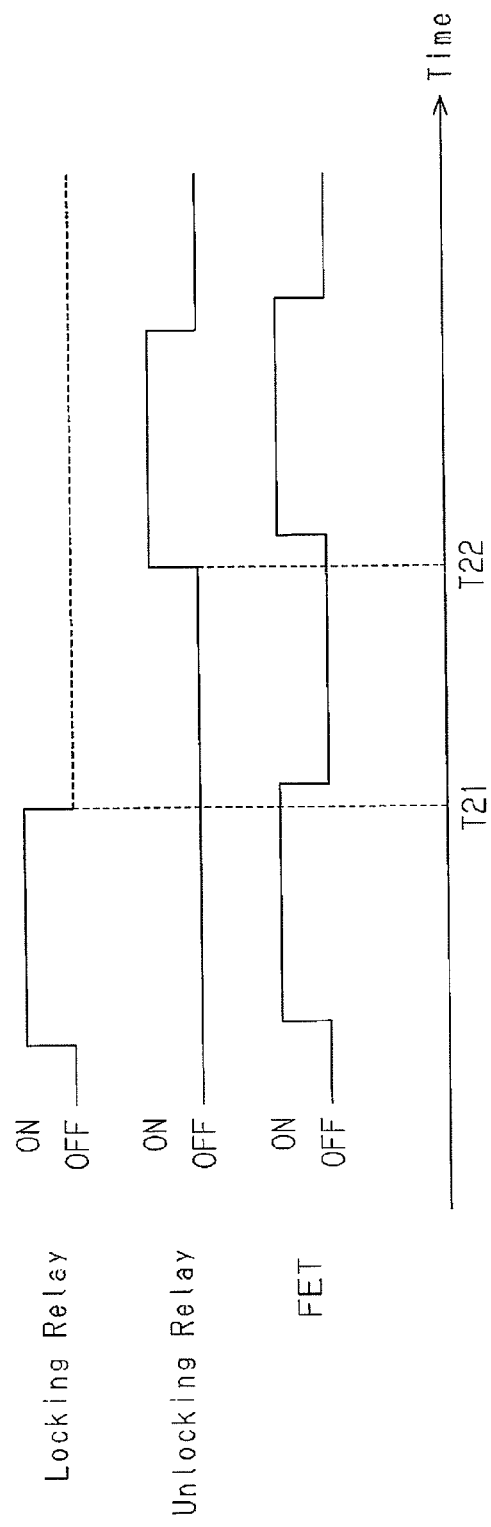
FIG. 7 is a time chart showing the operation of first and second relays and an FET in the prior art.

The steering shaft 3 has an outer surface including a recess 3a. The recess 3a is located along the axis of the lock bar 34. As shown in FIG. 3A, when a distal portion of the lock bar 34 is engaged with the recess 3a, the rotation of the steering shaft 3 is restricted. As shown in FIG. 3B, when the lock bar 34 is disengaged from the recess 3a, rotation of the steering shaft 3 is permitted.

Relay Operation

The control of the relays 44a and 44b and the drive restriction unit 43 in the control circuit 41 will now be described with reference to the time chart of FIG. 4. For example, the operations of the relays 44a and 44b when producing reverse rotation with the motor 33 to disengage the lock bar 34 from the steering shaft 3 will now be described. At a point of time shown corresponding to the left end of FIG. 4, the relays 44a and 44b open the motor drive circuit and the drive restriction unit 43 is deactivated. Further, in the drive restriction unit 43, the IG relay 22 is activated and a high level signal is received from the bus 20.

As shown in FIG. 4, the control circuit 41 first activates the second relay 44b (time T1). In this state, the drive restriction unit 43 remains deactivated. Thus, part of the motor drive circuit, in particular, the part from the drive restriction unit 43 to ground is open. Accordingly, the motor 33 is not supplied with power. In this state, when there is no accumulated matter on the first relay 44a or the second relay 44b, the part of the circuit from the power supply to the conductivity determination circuit 50 is closed. Thus, high level voltage is applied to the conductivity determination circuit 50. However, when the part of the circuit from the power supply to the conductivity determination circuit 50 does not close due to entrapment of accumulated matter or the like in either one of the two relays 44a and 44b, low level voltage would continue to be applied to the conductivity determination circuit 50. The control circuit 41 detects or monitors the voltage applied to the conductivity determination circuit 50 to determine whether or not accumulated matter is present on the first relay 44a or second relay 44b.

Then, the control circuit 41 activates the first relay 44a (time T2). The mechanical operation of the first relay 44a increases the probability of removal of accumulated matter when such matter is present. In this state, the control circuit 41 activates the drive restriction unit 43 (time T3). Here, the relays 44a and 44b are both activated. Thus, the motor drive circuit is open.

The control circuit 41 then deactivates the first relay 44a (time T4). This closes the motor drive circuit and thereby starts supplying power to the motor 33. When the motor 33 is being supplied with power, the motor 33 produces reverse rotation and disengages the lock bar 34 from the steering shaft 3.

At the moment the motor drive circuit closes, the potential difference between the upstream and downstream sides of the first relay 44a generates an arc between the movable contact CP1a and fixed contact CP1b of the first relay 44a. Continued use of each contact gradually forms an oxidized film on the contact. The oxidized film may obstruct the conductivity of the contact. However, the arc would remove such an oxidized film from the contact. This suppresses such conductivity obstruction.

After the lock bar 34 is disengaged from the steering shaft 3, the control circuit 41 deactivates the second relay 44b (time T5). This opens the motor drive circuit and stops the supply of power to the motor 33. Then, the control circuit 41 deactivates the drive restriction unit 43 (time T6).

FIG. 4 shows the operation of the relays 44a and 44b when the motor 33 produces reverse rotation. When the motor 33 is producing forward rotation, the operation order of the relays 44a and 44b is reversed from that of FIG. 4. This would obtain the same effects as when the motor 33 is driven to produce reverse rotation.

The present embodiment has the advantages described below.

(1) When the drive restriction unit 43 is deactivated, the control circuit 41 activates and deactivates the first and second relays 44a and 44b, which actually do not have to be operated. This increases the probability of accumulated matter being removed from the first and second relays 44a and 44b. That is, the possibility of the motor drive circuit failing to function normally decreases.

(2) In a state in which the motor drive circuit is open, the control circuit 41 activates the drive restriction unit 43 and then closes the motor drive circuit by activating and deactivating the relays corresponding to the rotation direction of the motor 33. Activation and deactivation of the relays generates an arc the moment the motor drive circuit closes. The generation of the arc would remove foreign matter, such as an oxidized film, from the relay. Accordingly, the conductivity of the motor drive circuit is not obstructed.

It should be apparent to those skilled in the art that the present invention may be embodied in many other specific forms without departing from the spirit or scope of the invention. Particularly, it should be understood that the present invention may be embodied in the following forms.

In the above embodiment, when producing reverse rotation with the motor 33, time T1 at which the first relay 44a is activated and time T2 at which the second relay 44b is activated may be reversed. Further, the time T5 at which the second relay 44b is deactivated and the time T6 at which the drive restriction unit 43 is deactivated may be reversed. Further, these actions may be performed at the same time. This would also obtain advantage (1) of the above embodiment.

In the above embodiment, the drive restriction unit 43 may be omitted, and the control circuit 41 may function as the drive restriction unit 43. For example, when reversing the rotation of the motor 33, the control circuit 41 may deactivate the first relay 44a and deactivate the second relay 44b at the same time so that time T1 and time T2 are the same. This would also obtain advantage (1) of the above embodiment.

In the above embodiment, the power control unit 15 is used as a means for prohibiting the driving of the motor 33. However, the present invention is not limited in such a manner and a different control unit (e.g., verification control unit 14, engine control unit 17, and meter control unit 18) may be used to restrict the driving of the motor 33. For instance, when using the engine control unit 17 to restrict the driving of the motor 33, after outputting an engine starting completion signal, the engine control unit 17 may send a motor drive prohibition signal to the bus 20. This would also obtain the same advantages as the above embodiment.

In the above embodiment, a state in which the vehicle is being driven refers to a state in which the engine is running. When this condition is satisfied, the power control unit 15 outputs a motor drive prohibition signal. However, the present invention is not limited in such a manner. For example, a state in which the vehicle is being driven may refer to a state in which the engine is running and the gear lever is located at a driving position ("D" range or "R" range). Further, instead of using the driving state of the engine, a state in which the vehicle is being driven may refer to a state satisfying at least one of the conditions of the functional position of an electric system being in an ON state and the vehicle speed being zero "0". When making such a modification, the power control unit 15 outputs a motor drive prohibition signal upon satisfaction of the above conditions.

In the drive restriction unit 43 of the above embodiment, the first switching element 45 and the inverter 47 may be omitted. That is, the drive restriction unit 43 may start and stop the supply of power to the motor 33 regardless of the state of the IG relay.

In the above embodiment, the switching elements 45 and 46 may be formed by switching elements other than FETs such as bipolar transistors.

The drive restriction unit 43 does not have to include the AND circuit 48 and may have any circuit configuration as long as the supply of power to the motor 33 can be stopped when a signal for prohibiting driving of the motor 33 is output. For example, the drive restriction unit 43 may be formed by relays like the first and second relays 44a and 44b. This obtains the same advantages as the above embodiment.

In the above embodiment, the drive restriction unit 43 does not have to be located at the downstream side of the driver unit 42, that is, between the driver unit 42 and ground. The drive restriction unit 43 may be arranged at the upstream side of the driver unit 42, that is, between the driver unit 42 and the power supply.

In the above embodiment, the relays 44a and 44b may be operated as illustrated in FIGS. 5 and 6. For example, the control circuit 41 first activates the first relay 44a (time T7) to determine whether the motor drive circuit is normal and thereafter deactivates the first relay 44a (time T8). If the motor drive circuit is normal, the control circuit 41 activates the drive restriction unit 43 (time T9) and thereafter activates the first relay (time t10) while keeping the second relay 44b deactivated. This generates an arc and removes an oxidized film from the first relay 44a. If the motor drive circuit is abnormal, the control circuit 41 activates the first relay 44a (time T11), the second relay 44b (time T12), and the drive restriction unit 43 (time T13) as illustrated in FIG. 6. The control circuit 41 deactivates one of the first and second relays (for example, the second relay 44b) at time T14. This generates an arc and removes an oxidized film from the one of the first and second relays (for example, the second relay 44b).

The above modifications may be combined.

The present examples and embodiments are to be considered as illustrative and not restrictive, and the invention is not to be limited to the details given herein, but may be modified within the scope and equivalence of the appended claims.

The invention claimed is:

1. An electric steering wheel lock device comprising:
a control circuit that starts and stops supplying power to a motor that actuates a lock mechanism to lock and unlock a movable member of a vehicle steering mechanism, wherein the control circuit changes contact states of first and second relays to switch a supplying direction of the power; and
a drive restriction unit that stops and starts supplying power to a drive circuit for the motor;
wherein the control circuit changes contact states of the first and second relays when the drive restriction unit stops supplying power to the drive circuit,
the drive circuit is connected to a high potential power supply and a low potential power supply, and
in a state in which the drive restriction unit stops supplying power to the drive circuit, the control circuit first connects the first and second relays to the high potential power supply and then supplies power to the drive circuit before changing a contact state of one of the first and second relays in accordance with a direction in which the motor produces rotation.

2. The electric steering wheel lock device according to claim 1, further comprising a conductivity determination circuit arranged between the drive restriction unit, which is arranged at a downstream side of the conductivity determination circuit, and the first and second relays, which are arranged at an upstream side of the conductivity determination circuit;
wherein when the control circuit deactivates the drive restriction unit, the control circuit changes the contact state of one of the first and second relays in accordance with the direction in which the motor produces rotation, measures a voltage level with the conductivity determination circuit,
detects a conductive state of the drive circuit based on the measured voltage level,
determines that a conductivity abnormality is occurring in one of the first and second relays when the conductive state is abnormal, and
changes the contact state of one of the first and second relays, and
the drive restriction unit then supplies power to the drive circuit and opens the drive circuit and subsequently changes the contact state of one of the first and second relays in accordance with the direction in which the motor produces rotation to close the drive circuit, and
wherein when the conductive state is normal, the drive restriction unit supplies power to the drive circuit.

3. The electric steering wheel lock device according to claim 2, wherein after the control circuit determines the conductive state, the control circuit
changes the contact state of one of the first and second relays to open the drive circuit,
subsequently, when the conductive state is normal, activates the drive restriction unit and then changes the contact state of the one of the first and second relays to close the drive circuit, and
when the conductive state is abnormal, changes the contact state of the one of the first and second relays and then activates the drive restriction unit before changing the contact state of the one of the first and second relays to close the drive circuit.

4. The electric steering wheel lock device according to claim 1, wherein when the drive restriction unit is stopping the supply of power to the drive circuit, the control circuit deactivates each of the first and second relays and then activates each of the first and second relays.

5. A vehicle theft prevention system comprising the electric steering wheel lock device according to claim 1.

6. A lock control unit that controls a motor, wherein the motor actuates a lock mechanism that locks and unlocks a movable member of a vehicle steering mechanism, the lock control unit comprising:
a motor drive circuit connected between a high potential power supply and a low potential power supply, wherein the motor produces rotation in a first direction when a first direction current flows to the motor drive circuit and produces rotation in a second direction when a second direction current flows to the motor drive circuit, the motor drive circuit includes a first relay and a second relay and each of the first and second relays is switched between a first contact state, which corresponds to the first direction current, and a second contact state, which corresponds to the second direction current;
a switching element that opens and closes the motor drive circuit, wherein the switching element is arranged apart from the first and second relays in the motor drive circuit; and
a control circuit that controls the first and second relays and the switching element,
wherein the control circuit
temporarily switches, before the first direction current is supplied, one of the first and second relays to the second contact state, which corresponds to the second direction current while keeping the other one of the first and second relays in the first contact state and keeping the switching element deactivated to open the motor drive circuit,
activates the switching element to close the motor drive circuit when the one of the first and second relays is temporarily switched to the second contact state and the other one of the first and second relays is kept in the first contact state, and
switches the one of the first and second relays to the first contact state, which corresponds to the first direction current, while keeping the other one of the first and second relays in the first contact state when the motor drive circuit is closed by the switching element.

7. The lock control unit according to claim 6, wherein the control circuit
temporarily switches, before the second direction current is supplied, one of the first and second relays to the first contact state, which corresponds to the first direction current, while keeping the other one of the first and second relays in the second contact state and keeping the switching element deactivated to open the motor drive circuit, activates the switching element to close the motor drive circuit when the one of the first and second relays is temporarily switched to the first contact state and the other one of the first and second relays is kept in the second contact state, and switches the one of the first and second relays to the second contact state, which corresponds to the second direction current, while keeping the other one of the first and second relays in the second contact state when the motor drive circuit is closed by the switching element.

8. An electric steering wheel lock device comprising: the lock control unit according to claim 6;

a motor connected to the lock control unit, and a lock mechanism actuated by the motor, wherein the lock mechanism locks and unlocks a movable member of a vehicle steering system mechanism.

\* \* \* \* \*